W. ROYCE.
Fire-Escape.
No. 215,166. Patented May 6, 1879.
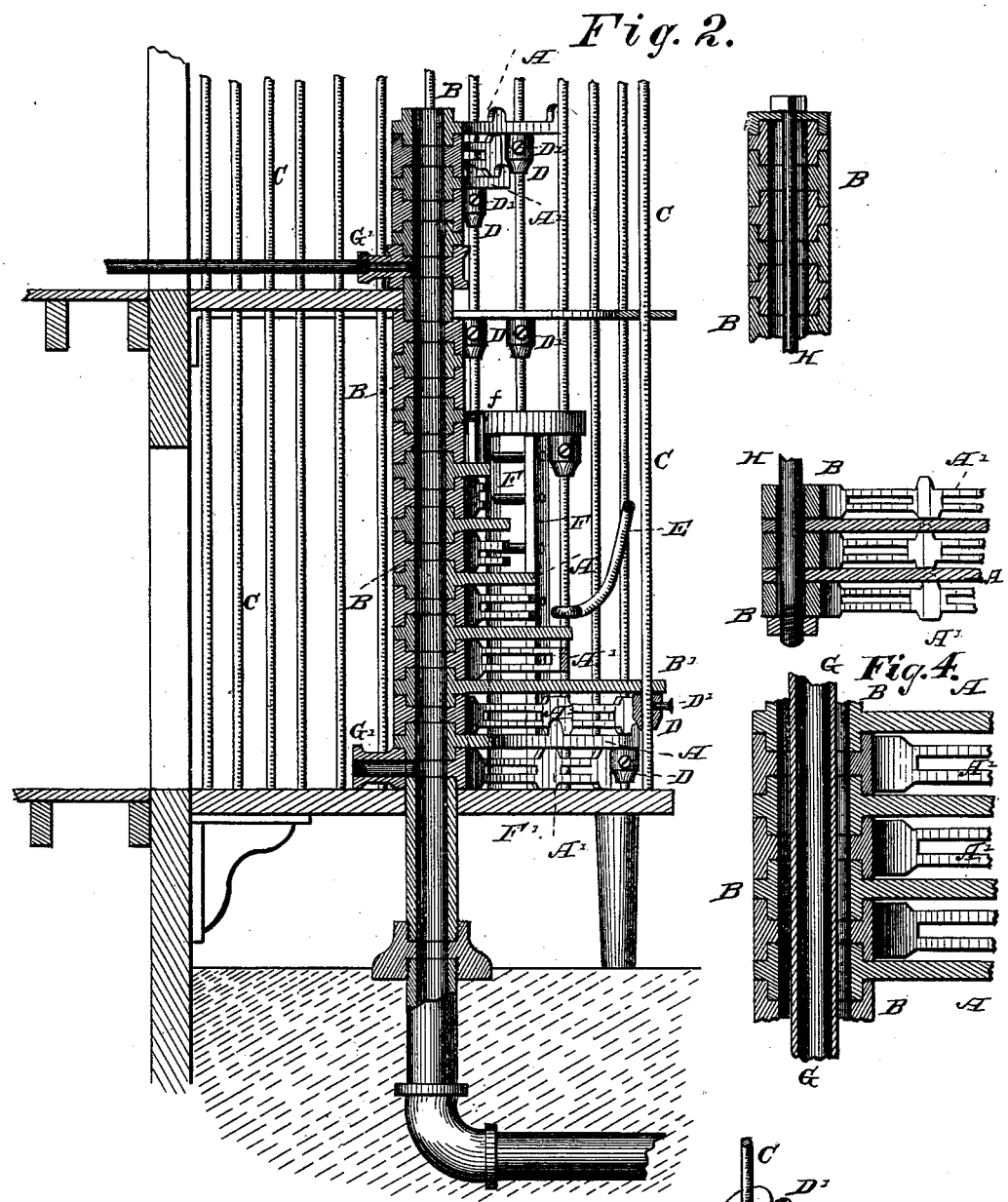

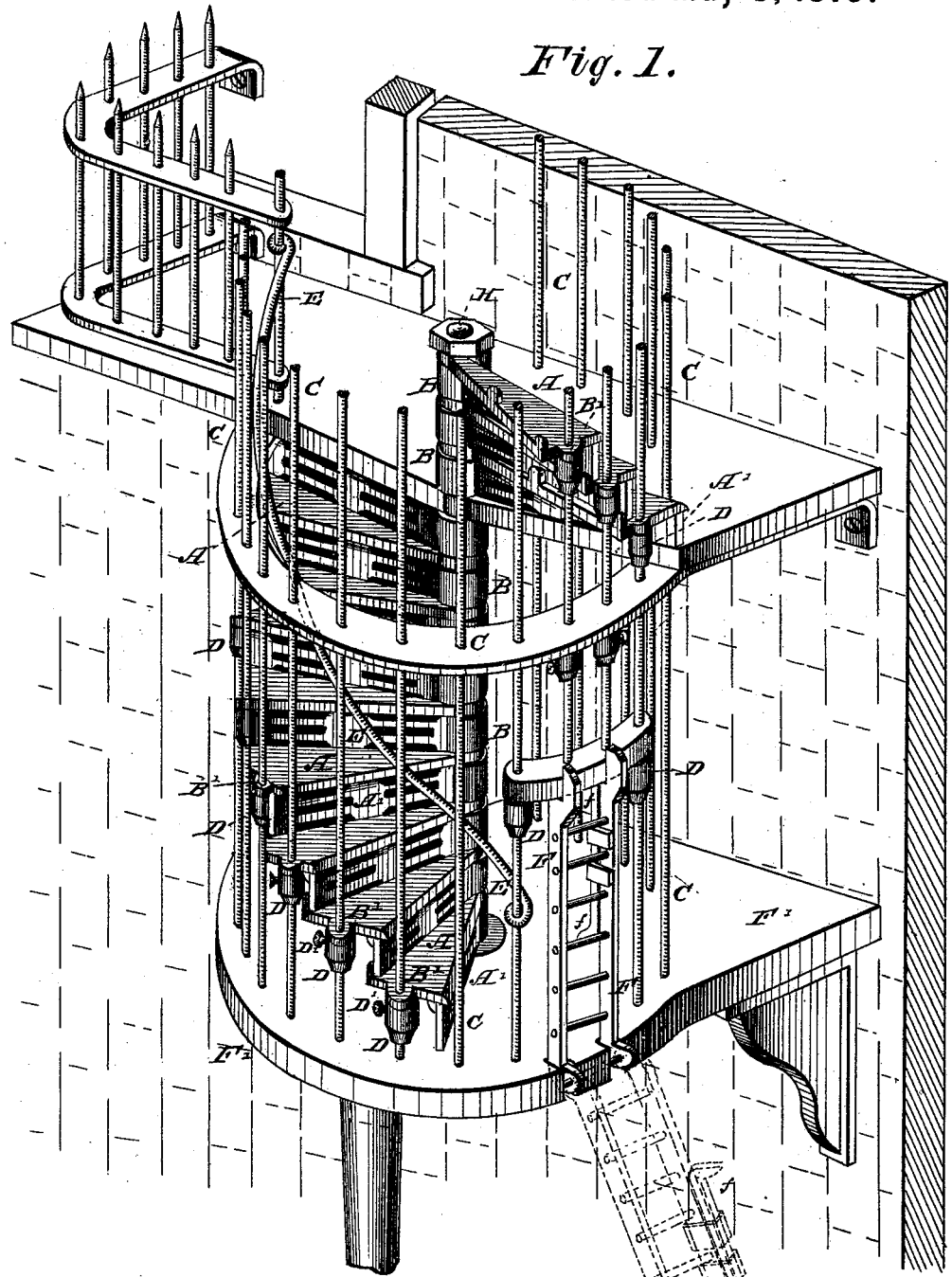

UNITED STATES PATENT OFFICE.

WESLEY ROYCE, OF COLUMBUS, OHIO, ASSIGNOR TO D. H. ROYCE AND JAMES G. PULLING, OF SAME PLACE, ONE-THIRD TO EACH.

IMPROVEMENT IN FIRE-ESCAPES.

Specification forming part of Letters Patent No. 215,166, dated May 6, 1879; application filed September 4, 1878.

*To all whom it may concern:*

Be it known that I, WESLEY ROYCE, of Columbus, in the county of Franklin and State of Ohio, have invented certain new and useful Improvements in Fire-Escapes; and I do hereby declare the following to be a full, clear, and exact description of the invention, such as will enable others skilled in the art to which it pertains to make and use it, reference being had to the accompanying drawings, which form part of this specification.

My invention relates to a new and useful improvement in fire-escapes; and consists in making the escape in the nature of a winding stairway on the exterior or interior of the building, having in connection therewith an open case or cage formed of iron rods extending from top to bottom, inclosing said stairway, and, also, in making the central stem or support hollow, so as to constitute a stand-pipe to convey water to the various points where it may be needed.

In the drawings, Figure 1 is a view of a fire-escape embodying the features of my invention. Fig. 2 is a view, in section, of same. Fig. 3 represents separate parts. Fig. 4 is a modification.

Heretofore fire-escapes of this nature have been formed of an open stairway, or, if inclosed, said inclosure has been made in the form of a close cylinder, and the central stem has been made to serve no other purpose than to support the structure.

A A', &c., are a series of stairs, each provided with a hub portion, B, which constitutes a part of the central column which supports the inner ends of the stairs, and from which they all radiate. C are rods which extend from the base to the top of the structure and form an open cage around the stairway, at the same time serving to stay the outer ends of the separate stairs. This open cage serves the double purpose of affording good hand-holds for persons descending the stairs, and preventing all danger of falling, while at the same time it affords security against intruders from without, who might otherwise enter the building by way of the stairs. Moreover, the cage, being thus formed of rods, is open, so as to admit light to the stairway.

The outer end of each stair is secured, in any suitable manner, to the rods C; and I prefer that there shall be a separate rod for each stair, and that the fastening shall be effected by passing the rod through a lug in the end of the stair, and additional security and support be given by a collar located on the rod beneath the stair, said collar being fixed by a suitable key or set-screw, or in other effective manner. Such an arrangement is shown in the drawings, B' being the lug through which the rod passes, and D D' the collar and set-screw. E is a hand-rail, secured preferably to the rods, and disconnected from the stairs, as the structure is thereby simplified.

F is a hinged door, secured in position by a bolt or other fastening, *f*. The door is in the nature of a ladder hinged at the bottom, and of such height that when it is let down its top will rest upon the ground or landing beneath, and at a suitable angle to constitute a good means of descent.

The hub portions B of the stairs are made hollow, so that they shall, when put together, constitute a stand-pipe, with water-tight joints, through which water from the mains may be conveyed to suitable elevations, and be provided at such points with hose attachments or plugs; or the hollow space formed by the cores of the hub-pieces may simply constitute a passage-way for a separate water-pipe, which may rise from the main and be carried into the building, or provided with plugs at different heights for the attachment of hose. G represents such a water-pipe, and G' are plugs for attachment of hose. F' is the bottom plate, which serves as the principal support of the stairway, and from which the vertical rods spring, though the rods may start from the ground, as also the stairway.

The rise or the tread of each stair may be made in a single casting; or the rise may be made in one piece and the tread in another, the two parts being fitted to each other, and each provided with its own hub-piece, B.

I prefer generally to make the rise separate from the tread, in order that by using rises of different heights the same tread may always be employed and the stairs be suited to stories of different heights by using a rise of suitable height.

H is a rod which may be used to bind the stairs together when a central pipe is not employed, or when the hubs themselves do not unite to form the stand-pipe.

I make no claim in this patent to the particular features of construction and arrangement of parts illustrated in Fig. 4.

What I claim is—

1. A fire-escape connected with a building, and consisting of a spiral stairway with suitable landings, said stairway being incased with metallic rods, which pass through the outer ends of the separate stairs and support the same in proper position, substantially as set forth.

2. A fire-escape connected with a building, and consisting of a spiral stairway the treads of which are constructed with openings in their outer ends, in combination with metallic rods extending through the outer ends of the treads, and collars attached to said rods beneath the treads and adapted to support the same, substantially as set forth.

3. The combination, with a spiral-stairway fire-escape, of the incasing vertical rods and a swinging gate adapted to close the outlet when not in use, but constituting a means of descent to the ground or landing when in use, substantially as described.

4. A fire-escape connected with a building and provided with a spiral stairway formed of separate stairs, each constructed with a hollow hub-piece, thereby constituting a vertical conduit, said hub-pieces being provided with openings or water-plugs at the several landings of the fire-escape, to allow water to be conveyed to any desired point, substantially as set forth.

5. The combination, with the fire-escape provided with open-work casing of metallic rods, of a vertically-swinging hinged gate and mechanism for locking it upon the inside when not in use, substantially as set forth.

In testimony whereof I have signed my name to this specification in the presence of two subscribing witnesses.

WESLEY ROYCE.

Witnesses:
CHAS. M. DEXTER,
EUGENE LANE.